US009832176B2

(12) United States Patent
Abbott

(10) Patent No.: US 9,832,176 B2
(45) Date of Patent: *Nov. 28, 2017

(54) SYSTEM AND METHOD FOR NON-REPLAYABLE COMMUNICATION SESSIONS

(71) Applicant: DROPBOX INC., San Francisco, CA (US)

(72) Inventor: Graham Abbott, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,548

(22) Filed: Nov. 15, 2016

(65) Prior Publication Data

US 2017/0134352 A1   May 11, 2017

Related U.S. Application Data

(63) Continuation of application No. 14/549,812, filed on Nov. 21, 2014, now Pat. No. 9,509,679.

(51) Int. Cl.
*H04L 29/06* (2006.01)
*H04L 9/08* (2006.01)

(52) U.S. Cl.
CPC ............ *H04L 63/061* (2013.01); *H04L 9/083* (2013.01); *H04L 9/0825* (2013.01);
(Continued)

(58) Field of Classification Search
CPC .................................................... H04L 9/0825
(Continued)

(56) References Cited

U.S. PATENT DOCUMENTS 8,904,181 B1    12/2014  Felsher
9,509,679 B2 *  11/2016  Abbott ................. H04L 9/0825

FOREIGN PATENT DOCUMENTS

WO    02/101974 A1    12/2002
WO    2007/073603 A1   7/2007

OTHER PUBLICATIONS

Menezes, Vanstone, Oorschot: "Handbook of Applied Cryptography", 1997, CRC Press LLC, USA, XP1525013, pp. 543-590.
(Continued)

*Primary Examiner* — Jacob Lipman
(74) *Attorney, Agent, or Firm* — DLA Piper LLP US

(57) ABSTRACT

Systems, methods, and non-transitory computer-readable storage media for a non-replayable communication system are disclosed. A first device associated with a first user may have a public identity key and a corresponding private identity. The first device may register the first user with an authenticator by posting the public identity key to the authenticator. The first device may perform a key exchange with a second device associated with a second user, whereby the public identity key and a public session key are transmitted to the second device. During a communication session, the second device may transmit to the first device messages encrypted with the public identity key and/or the public session key. The first device can decrypt the messages with the private identity key and the private session key. The session keys may expire during or upon completion of the communication session.

34 Claims, 7 Drawing Sheets

(52) U.S. Cl.
CPC ........ *H04L 9/0844* (2013.01); *H04L 63/0281* (2013.01); *H04L 63/0428* (2013.01); *H04L 63/0442* (2013.01); *H04L 63/062* (2013.01); *H04L 63/067* (2013.01); *H04L 63/068* (2013.01); *H04L 63/0823* (2013.01)

(58) Field of Classification Search
USPC ........................................................ 713/171
See application file for complete search history.

(56) References Cited

OTHER PUBLICATIONS

International Search Report issued on counterpart PCT Application No. PCT/US2015/061004, dated Jul. 14, 2016.

\* cited by examiner

SYSTEM AND METHOD FOR NON-REPLAYABLE COMMUNICATION SESSIONS

CROSS-REFERENCE TO RELATED APPLICATIONS

This application is a continuation of U.S. application Ser. No. 14/549,812, filed Nov. 21, 2014, also entitled: "System and Method for Non-Replayable Communication Sessions," the content of which is incorporated herein by reference in its entirety.

TECHNICAL FIELD

The present technology pertains to communication security, and more specifically pertains to a technique for rotating security keys to prevent message recovery.

BACKGROUND

Modern communications technology enables remotely situated communication devices to communicate with each other securely by text, voice, audio, video, and other means. However, the content of the communication may not always be completely secure. It can be captured or replayed by a third party. For instance, some digital communication sessions may be vulnerable to snooping or eavesdropping by a malicious third-party. In addition, one may be compelled by law enforcement or government agencies to reveal logs or contents involved in past communication sessions.

Some communications can be encrypted to discourage or prevent eavesdropping. However, the conventional solution requires some level of sophistication on the part of the users to generate keys, exchange the keys, and then use the keys to encrypt the communication. Additionally, since the users are likely to use the same set of key for all communications, the keys may be compromised or the users may be compelled to turn over the keys to a third-party. Thus, there exists a need to create a communication system where the communications cannot be easily captured and replayed. Moreover, even if the encrypted data is captured by someone, there needs to be a way to hide or obscure the encryption key, possibly even from the users participating in the communication.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for conducting non-replayable communication sessions. Two or more communication devices participating in a communication session may register with a central trusted authority by posting public identity keys. A device requesting communication with another device may send the request to the other device through the central trusted authority. Should the other device accept the request, the two communication devices may perform a key exchange such that each device would end up with two sets of keys—one identity key pair and one session key pair of their own—and two public keys from the other device. The devices can then engage in a secure communication by encrypting outgoing messages with the other device's public identity key and/or public session key. The session keys can be rotated on a regular basis or upon completion of the communication session so that the content of the communication cannot be replayed.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The term "non-replayable" or "non-recoverable" as used herein, in the context of communication, may mean that, once a communication session is over, recreation of the content of the communication would no longer be possible or practical. For example, a message encrypted with a sufficiently large encryption key value may be considered non-replayable without use of the matching decryption key because converting the ciphertext into plaintext within a reasonable amount of time without the use of the correct cryptographic key would be practically infeasible. As such, non-replayability does not necessarily imply that it would be theoretically or mathematically impossible to recreate an encrypted communication, but rather only that it would be computationally costly or prohibitive to do so.

The term "key," "security key," or "cryptographic key" as used herein may refer to a numeric value or a piece of information that determines the functional outcome of a cryptographic algorithm. Keys are one of the basic building blocks of a cryptographic algorithm or cipher.

Figure 1:
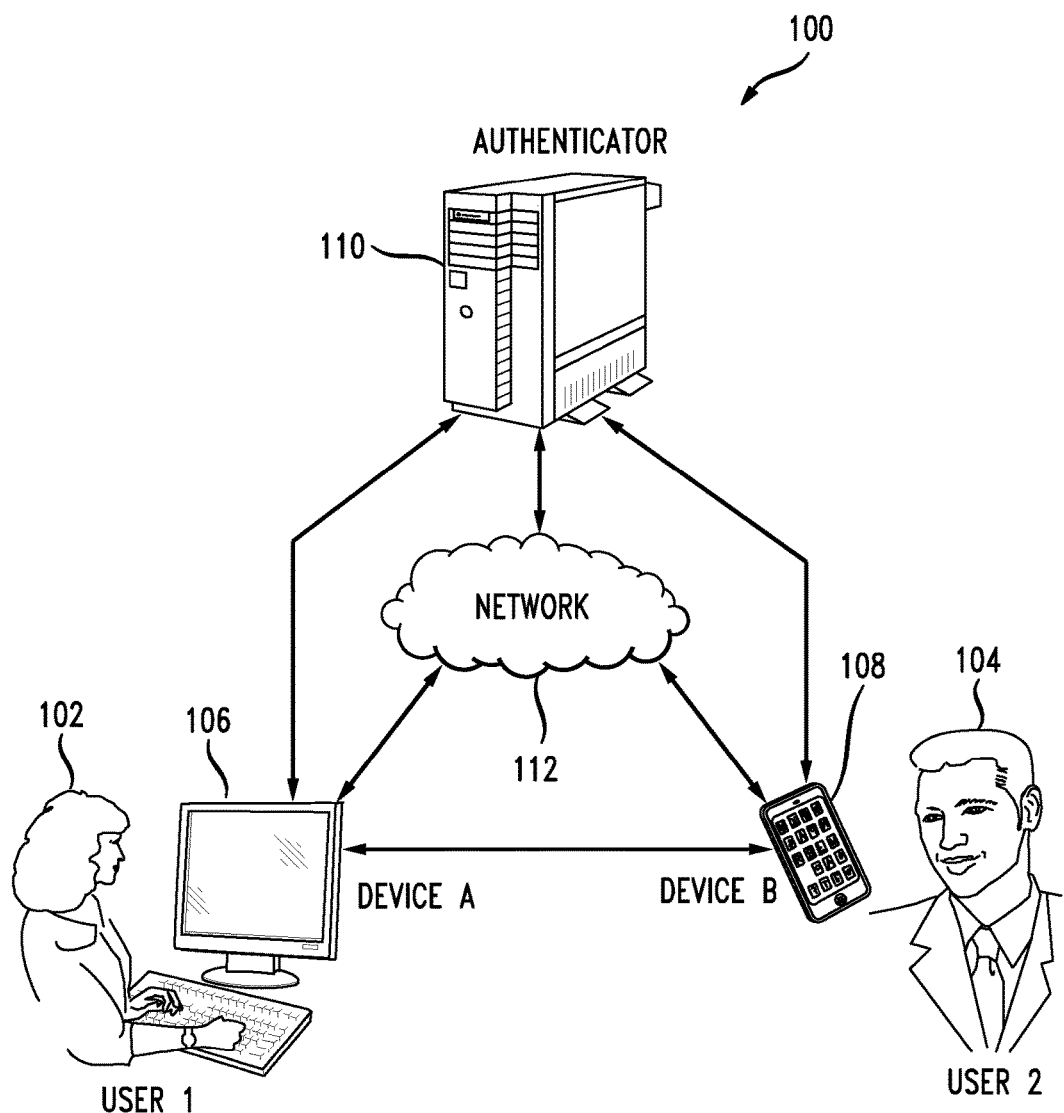
FIG. 1 shows an exemplary non-replayable communication session between two users.

The disclosed technology addresses the need in the art for conducting a communication session between two users such that the content of the communication session would not be recoverable. FIG. 1 shows an exemplary non-replayable communication session between two users—User A 102 and User B 104. Communication system 100 may consist of Device A 106, Device B 108, and central trusted authority 110. User A 102 and User B 104 may have access to communication devices such as Device A 106 and Device B 108, respectively. Devices 106, 108 can each be any device that is capable of communicating with other devices. For example, devices 106, 108 may each be a computer, a desktop computer, a laptop computer, a server, a personal digital assistant (PDA), a telephone, a cellular phone, a smartphone, a tablet computer, a wearable computer, or a mobile communicator. Devices 106, 108 may be capable of wired and/or wireless communication. For example, devices 106, 108 may be able to communicate via a local area network (LAN), a wide area network (WAN), a public switched telephone network (PSTN), a cellular network, a cable network, the Internet, etc. Although FIG. 1 shows only two communication devices, one of ordinary skill in the art will understand that three or more communication devices may participate in a communication session simultaneously.

Although Device A 106 and Device B 110 can communicate with each other directly via a peer-to-peer method, Device A 106 and Device B 110 may also communicate through or with help from a server such as authenticator 110. Authenticator 110 may be a central trusted authority capable of registering client devices, such as Device A 106 and Device B 108, storing information about the client devices, storing their public identity keys, provide presence information for client devices, and/or relaying various packets and messages between the client devices. Device A 106 and Device B 108 can communicate with authenticator 110 directly as well as via network 112. Device A 106 and Device B 108 can also communicate with each other via network 112. Network 112 can include a WAN and a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as LANs, virtual LANs (VLANs), corporate networks, wide area networks, and virtually any other form of suitable wired or wireless network.

Devices 106, 108 may communicate with each other through text, voice, audio, video, etc. For example devices 106, 108 can communicate by telephone conversation, conference call, video conferencing, short message service (SMS), multimedia messaging service (MMS), instant messaging, web chat, Internet relay chat (IRC), peer-to-peer messaging, etc. Some or all of the content being communicated between Device A 106 and Device B 108 can be encrypted to protect the privacy of User A 102 and User B 104. As such, some or all of the messages exchanged between Device A 106 and Device B 108 can be converted into ciphertext (i.e., encrypted) by using a cryptographic algorithm before transmission and converted back into the original plaintext (i.e., decrypted) by using a related cryptographic algorithm.

Such encryption and decryption can be accomplished by symmetric-key algorithms, such as Advanced Encryption Standard (AES), where one cryptographic key is used for both encryption and decryption, or by asymmetric-key algorithms, also known as public-key cryptography, such as Rivest-Shamir-Adleman (RSA), where one cryptographic key is used to encrypt plaintext and another separate yet related key is used to decrypt ciphertext. In public-key cryptography, the two keys are also called a public key and a private (or secret) key. The public key may be widely distributed among other parties while the private key is usually kept secret from the others. The two keys are mathematically linked to each other and together they make up a cryptographic key pair. A message encrypted with one key can only be decrypted using the matching key. Although it may be theoretically possible to decrypt the ciphertext without using the matching key, it is said to be impossible or impractical, especially if the key value is sufficiently large, because it cannot be done within a reasonable amount of time even with help of an array of high-performance computers.

Device A 106 and Device B 108 can transmit keys to each other in a process called a "key exchange." In symmetric cryptography, Device A 106 and Device B 108 may exchange each other's keys through a secure channel such that each device can decrypt messages that have been encrypted by the other device. In asymmetric cryptography, Device A 106 and Device B 108 can transmit their public keys to each other. For example, Device A 106 can transmit its own public key to Device B 108 so that Device B 108 can encrypt its messages with Device A's public key. Subsequently, when Device A 106 receives the encrypted messages from Device B 108, Device A 106 can decrypt the messages by using its own matching private key.

The communication between Device A 106 and Device B 108 may be doubly encrypted. That is to say, a message being exchanged between Device A 106 and Device B 108 can be encrypted twice by using two separate pairs of cryptographic keys if asymmetric cryptography is being used. (In case of symmetric cryptography, two separate cryptographic keys can be used to encrypt the message twice, once with each key.) Thus, Device A 106 and Device B 108 may each have two pairs of cryptographic keys (i.e., two public keys and two private keys), and during the key exchange they may each send two public keys to the other device. Subsequently, Device A 106 may, for example, encrypt any outgoing messages to Device B 108 with Device B's two public keys. After receiving the encrypted messages, Device B 108 can use its two private keys to decrypt the messages. The doubly encrypted messages can be only decrypted with the two matching keys. If one of the two matching keys is missing, the messages encrypted with the missing key will be lost. Some public-key encryption algorithms, such as RSA, may exhibit a commutative property. In other words, a ciphertext message encrypted with two different public keys may be decrypted with the matching private keys in any order to obtain the correct plaintext message. As such, a message encrypted first with Public Key 1 and then with Public Key 2 can be decrypted with Private Key 1 and then with Private Key 2, or with Private Key 2 and then with Private Key 1, when it is assumed that Public Key 1 and Private Key 1 are a matching key pair and Public Key 2 and Private Key 2 are another matching key pair.

One of the two cryptographic key pairs can be an identity key pair consisting of a public identity key and a private identity key. The identity key pair may be uniquely associated with a user and her communication device. For example, a unique identity key pair can be generated for User 1 (102) and Device A 106. If User 1 (102) wishes to use a different communication device for communication, then a different pair of identity keys can be generated for that user-device pair. Conversely, if a different user, for instance User 3, wishes to use Device A 106 to communicate with someone, then yet another identity key pair, distinct from the identity key pair issued for User 1 (102) and Device A 106, can be generated for User 3 and Device A 106. By the same token, a unique identity key pair can be generated for User 2 (104) and his Device B 108. Device A 106 and Device B 108 may post their unique public identity keys to a central trusted authority, such as authenticator 110, so that they can be discovered by other devices and communication sessions may be initiated.

Another one of the two cryptographic key pairs can be a session key pair (also called "message key pair") consisting of a public session key (or "public message key") and a private session key (or "private message key"). The session key pair may be associated with a user, her communication device, and a communication session. Thus, in addition to being specifically related to the user and the device, the session keys may be also attached to a specific communication session that the user may be engaged in. As such, when User 1 (102) engages in a communication session with User 2 (104), Device A 106 can generate a session key pair to be used just for that particular communication session. When the communication session ends and User 1 (102) wishes to start a new communication session with User 2 (104) or anyone else, Device A 106 may discard the previously used communication session keys and generate a fresh set of message keys. Device A (106) may even refresh the session keys during the same communication session. Using different session keys for different communication sessions (or even the same communication session) can make it difficult to replay or recreate past communication sessions because the specific session keys required to decrypt the messages may have been long lost or destroyed. Meanwhile, Device A 106 need not worry about having to register with authenticator 100 before every communication session because the registration can be done with Device A's public identity key, which need not change from session to session.

Instead of using one pair of session keys for every communication session, the session keys can be refreshed (otherwise known as renewing, rotating, or rolling keys) at various time intervals. In some aspects, the session keys can be refreshed regularly according to a fixed time schedule. For example, Device A 106 and Device B 108 may be configured to generate new set of session keys for each device-user pair every 24 hours. In other aspects, the key rolling schedule may be dynamically adjusted depending on various factors such as security level of a particular communication session (e.g., more sensitive communication can get more frequent key refreshes), overall security level of the network (e.g., the keys may be rolled more frequently if there has been a reported hacking attempt at the network), device workload (e.g., the keys may be rolled less frequently if the device's processor is busy), user preference (i.e., User 1 (102) can manually set the refresh intervals), etc. Moreover, alternative to or in conjunction with the regular refresh schedule, Device A 106 can be configured to destroy or refresh the session keys upon completion of a communication session or any time before a subsequent communication session starts. The session keys can be rolled per message as well. In such a case, every message being exchanged between Device A 106 and Device B 108 can be preceded by a new key exchange, and each message may be encrypted with a unique session key. Device A 106 can destroy its own session keys, Device B's session keys, or both. In some aspects, identity keys may also be rolled. However, the identity keys may typically be rolled at a much lower frequency than the session keys, and rolling identity keys may not be necessary to achieve communication non-replayability.

Figure 2:
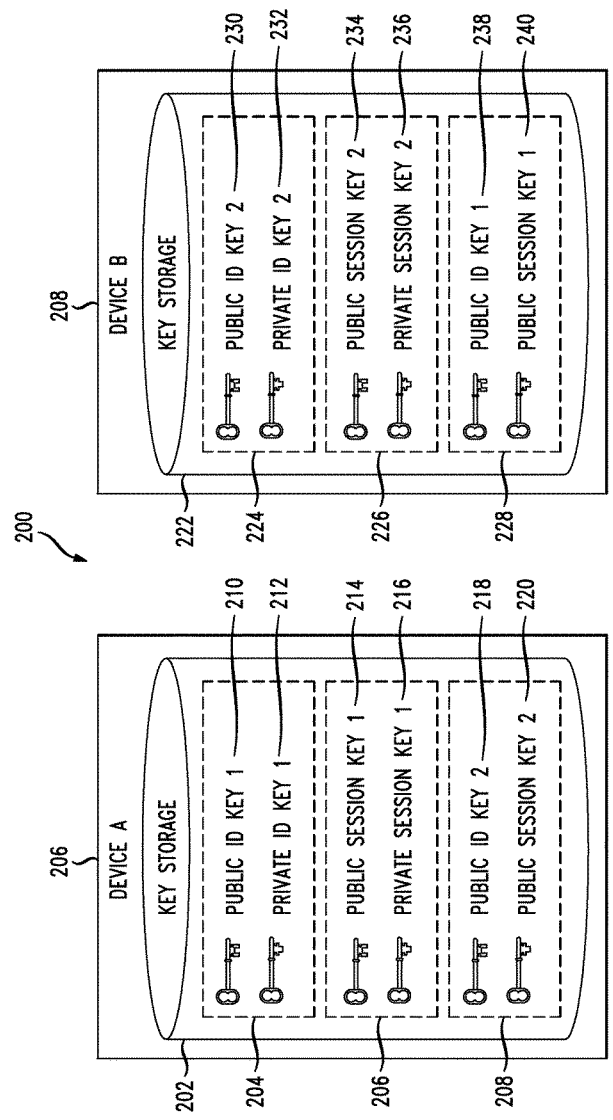
FIG. 2 shows exemplary client devices storing various cryptographic keys.

FIG. 2 shows how various cryptographic keys may be stored in exemplary client devices, especially after a key exchange is completed. In this exemplary storage configuration 200, Device A 106 and Device B 108 may each have a storage area for storing various cryptographic keys. In key storage 202, Device A 106 can store its own identity key pair 204 and its session key pair 206. Identity key pair 204 may consist of public identity key 1 (210) that is mathematically related to private identity key 1 (212). Similarly, session key pair 206 may consist of public session key 1 (214) and its mathematically linked private session key 1 (216). Device A 106 may publish public keys 210, 214 to other entities such as authenticator 110 of FIG. 1 or Device B 108, but may keep private keys 212, 216 secret (i.e., unpublished). Device B may also have a separate storage area such as key storage 222, where it keeps its own identity key pair 224 and its session key pair 226. Identity key pair 224 may consist of public identity key 2 (230) and private identity key 2 (232), while session key pair 226 may consist of public session key 2 (234) and private session key 2 (236). The keys illustrated in FIG. 2 may be generated and/or stored at different times.

Additionally, Device A 106 and Device B 108 may store each other's public keys 208, 228 that they may have been obtained through a key exchange or from a central authenticating authority. As such, Device A 106 may store in its key storage 202, public identity key 2 (218) and public session key 2 (220). In a similar fashion, Device B 108 may store public identity key 1 (238) and public session key 1 (240) in key storage 222. Thus, Device A 106 may encrypt outbound messages to Device B 108 with one or more of Device B's public keys 208, while Device B 108 may do the same with one or more of Device A's public keys 228.

Figure 5A:
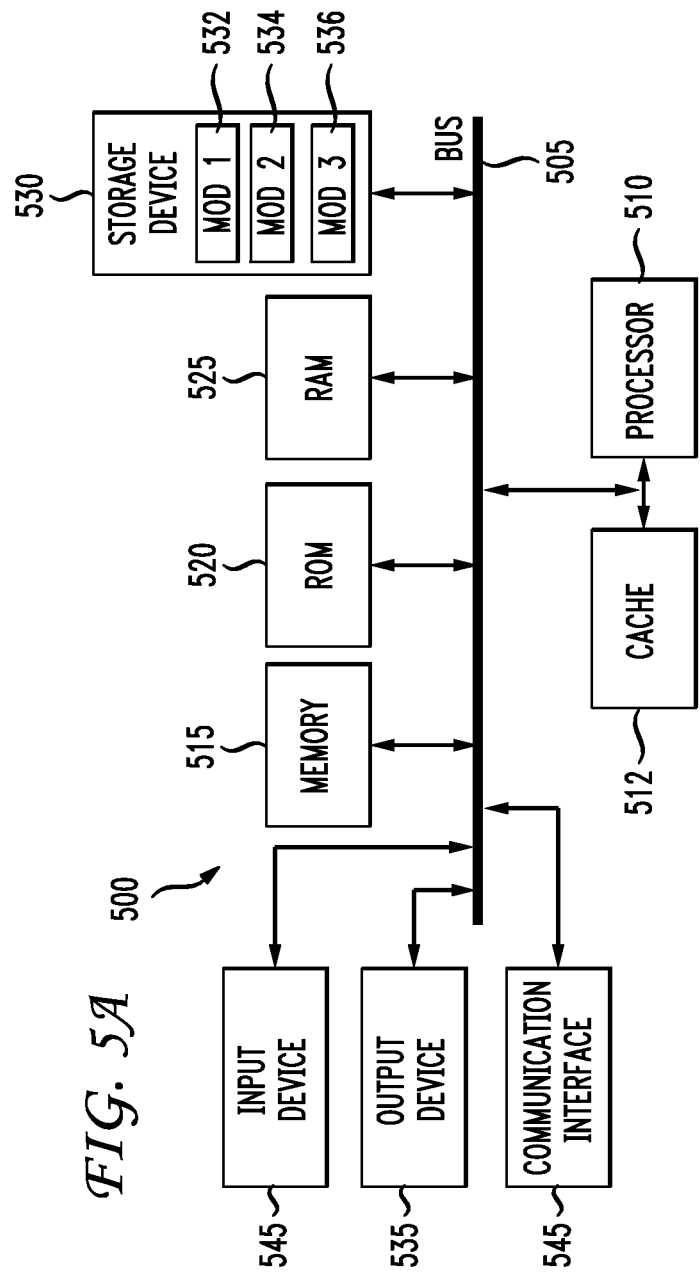
FIG. 5A shows the first exemplary system embodiment for implementing various embodiments of the present technology.

Key storage 202 and key storage 222 may each be a non-volatile memory such as storage device 530 or ROM 520, as shown in FIG. 5A. Alternatively, key storage 202 and key storage 222 may each be a volatile memory such as system memory 515 or RAM 525, as further shown in FIG. 5A. Although key storage 202 and key storage 222 are each shown as one storage device in FIG. 2, they may consist of two or more physical or logical storage devices of the same or different types. For example, Device A 106 may store some keys, such as identity keys 204 in a more permanent storage such as a hard disk drive, while it may store some other keys, such as session keys 206 or remote public keys 208, in a more volatile or temporary storage area, such as RAM. Furthermore, Device A 106 can be configured to write session keys 214, 216, 220 to the same blocks in the memory such that when one of the keys is refreshed, the previous key would be overwritten, thereby making it impossible or at least more difficult to retrieve the old key. In some aspects, session keys 214, 216, 220 may be only stored in a volatile memory such that when Device A 106 is powered off (and especially when turned back on), the keys would automatically become irretrievable. Losing a session key (especially a private session key) may mean that some of the past conversations could not decrypted (i.e., replayed or recreated), but the communication session can still continue by relying on different sets of keys.

Figure 3A:
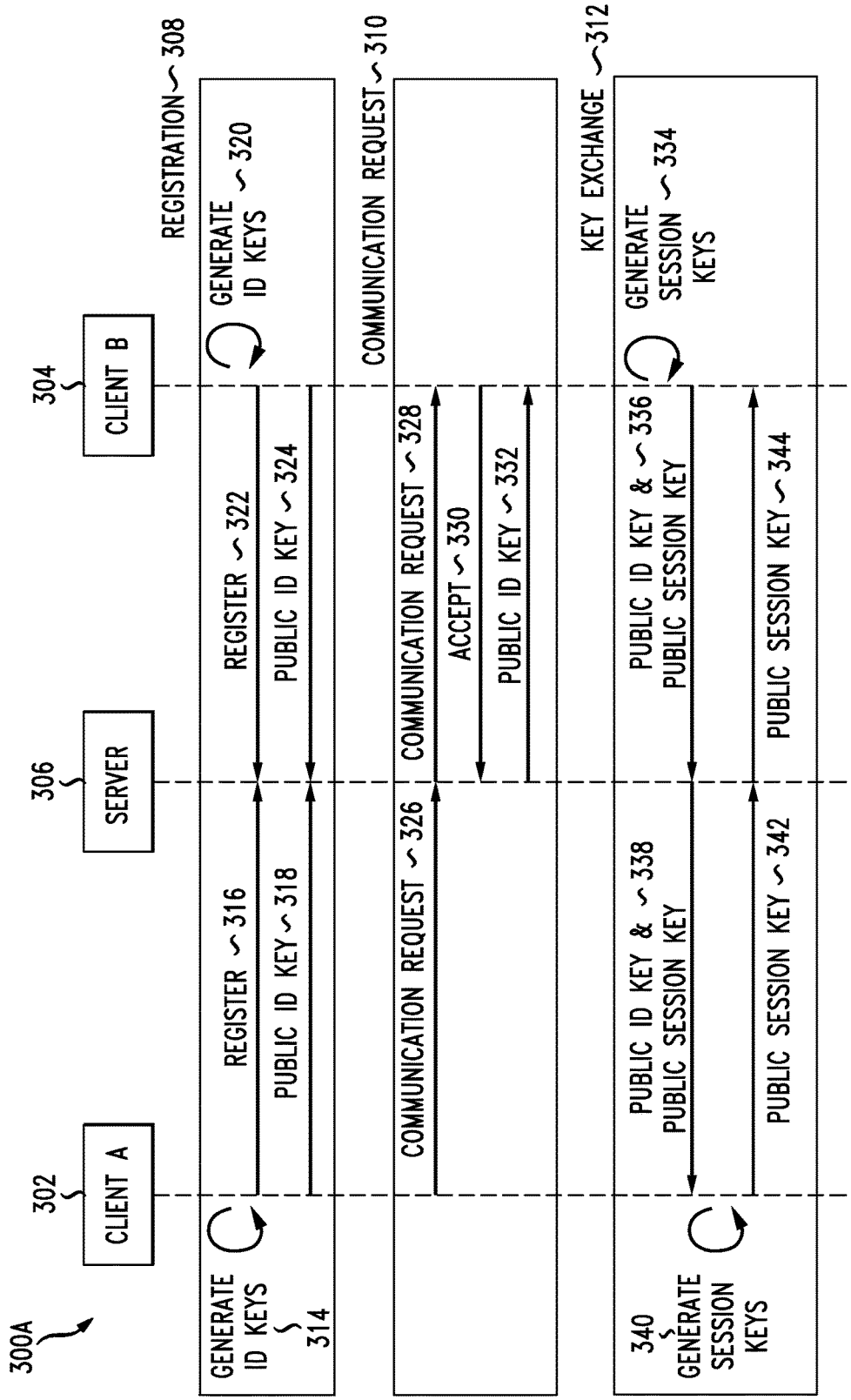
FIG. 3A shows a sequence diagram for initiating an exemplary non-replayable communication session.

FIG. 3A shows sequence diagram 300A for initiating an exemplary non-replayable communication session between Client A 302 and Client B 304. The communication session may also involve server 306. Client A 302, Client B 304, and server 306, may respectively correspond to Device A 106, Device B 108, and authenticator 110, as shown in FIG. 1. Any communication illustrated in FIGS. 3A and 4B as originating from one of the client devices, being forwarded by server 306, and terminating at the other client device can be transmitted from one client device to the other device (i.e., peer-to-peer) without having to traverse server 306 first. In order to conduct a non-recoverable communication session, the devices may engage in registration 308, communication request 310, and key exchange 312.

During registration phase 308, Client A may generate identity keys for itself (314). The identity keys may be an identity key pair that consists of a public identity key and a private identity key that are mathematically linked to each other. The identity key pair may be specific to Client Device A 302 and its user. Client A 302 may register with server 306, which can be a central trusted authority (316), by entrusting its public identity key to server 306 (318). During registration 316, Client A 302 may also provide server 306 with other relevant information such as a user's biographical information, routing information for Client A 302, device specifications/capabilities, etc. Alternatively, the identity keys can be generated by server 306, and server 306 can send a private identity key to Client A through a secure channel. Meanwhile, Client B 304 may also generate its own set of identity keys (320), register with server 306 (322), and transmit its public identity key to server 306 (324). Although FIG. 3A shows Client A 302 and Client B as registering with server 306 at the same time, the two devices may register with server 306 at different times. Moreover, a communication session need not be preceded by registration 308 every time. For example, if Client A 302 has already been registered with server 306, Client A 302 can start another communication session without performing another round of registration 308, unless there has been a change with Client A 302, such as renewal of its identity keys.

In order to initiate a communication session between Client A 302 and Client B 304, they may enter communication request phase 310. In this phase, the requesting device, such as Client A 302, can send a communication request to server 306 (326). Upon receiving the request, server 306 may attempt to authenticate Client A's 302 identity first to make sure that it is one of the registered client devices. Server 306 may also monitor each client device's presence information (i.e., whether the device and/or its associated user is currently available for communication) and decline Client A's 302 request if server 306 determines that Client B 304 is currently not available for communication. For example, if the presence status for Client B 304 shows up as "offline," "unavailable," or "busy," server 306 may inform Client A 302 that the request could not be completed on account of Client B 304 being unavailable. On the other hand, if server 306 does not determine that Client B 304 is unavailable, server 306 can then forward the request to Client B 304 (328). The presence information can be individualized based on specific users or devices instead of being globally applicable to every user. In other words, if Client A 302 can set multiple presence statuses for itself for different users or devices. For example, the user of Client A 302 may wish to avail herself to her family members while blocking access from her coworkers.

Client B can accept the request (330). The acceptance may be issued by Client B's 304 user. On the other hand, if Client B declines the request or simply fails to accept the request within a predetermined time limit, server 306 may inform Client A 302 that the request has been rejected, thereby ending the communication session. After Client B 304 accepts the request (330), Client B 304 can retrieve Client A's public identity key (332). Retrieving the public key may also be considered a part of key exchange phase 312, which will be discussed later. Client B 304 can store the retrieved public identity key in its storage, such as key storage 222 of FIG. 2. In some situations, Client A's 302 initial communication request may contain a digital certificate signed (i.e., encrypted) with its private identity key. After Client B 304 fetches the certificate along with the Client A's 302 public identity key, Client B 304 can use Client A's 302 public identity key to verify the certificate and thereby authenticate the requester's (i.e., Client A 302) identity. Client B 304 may also retrieve, as part of or along with Client A's 302 public identity key, routing information for Client A 302 so that Client B 304 can bypass server 306 and send data to Client A directly in future communication.

To ensure that Client A's 302 public identity key does not fall into the wrong hands, server 306 may employ security measures to prevent the key from being downloaded by more than one client device. For example, if the public identity key is downloaded by more than one device, an alarm may be triggered and Client A 302 and/or Client B 304 may be notified of the fact. If the user of Client B 304 wishes to communicate with Client A 302 from more than one client device, Client B 304 can pollinate other client devices with the same public identity key that belongs to Client A 302.

Once the communication request is accepted, Client A 302 and Client B 304 may engage in key exchange 312. First, Client B 304 can generate a pair of session keys—one public session key and one corresponding private session key—for itself (334). These session keys can be generated to be specific to Client B 304, its user, and the communication session requested by Client A 302. Client B 304 can then send out a key exchange message that contains Client B's 304 public identity key and public session key (336). The key exchange message can be sent to server 306, which then forwards the message along to Client A 302 (338). Alternatively, the key exchange message can be sent directly to Client A 302. The key exchange message may be encrypted with Client A's 302 public identity key such that only a device that has the matching private identity key (i.e., Client A 302) may be able to decrypt the message. In some aspects, the key exchange message may contain Client B's 304 public session key and a digital certificate signed with Client B's private identity key. Client A 302 may subsequently receive the message and authenticate its sender (i.e., Client B 304) by verifying the certificate with Client B's 304 public identity key that was posted to server 306 earlier by Client B 304 and retrieved by Client A 302. After Client A 302 receives the key exchange message, it can decrypt the message (e.g., by using its own private identity key) and store the received public identity key and/or public session key from Client B 304 in the key storage, such as key storage 202 as shown in FIG. 2.

Client A 302 may then generate its own set of session keys (340)—one public session key and one corresponding private key—although Client A 302 may generate the session keys before it receives Client B's 304 public session key. The generated session keys can be specific to Client A 302, its user, and the communication session requested by Client A 302. Using Client B's 304 public session key, Client A 302 can encrypt another key exchange message that contains Client A's 302 own public session key. This second key exchange message can be doubly encrypted with Client B's 304 public identity key as well. Client A 302 can then send the encrypted key exchange message to server 306 (342), which passes the message to Client B 304 (344). Alternatively, the second key exchange message may be sent directly from Client A 302 to Client B 304 without passing through server 306. After receiving the message, Client B 304 can decrypt the message and store the received public session key in its storage.

Figure 3B:
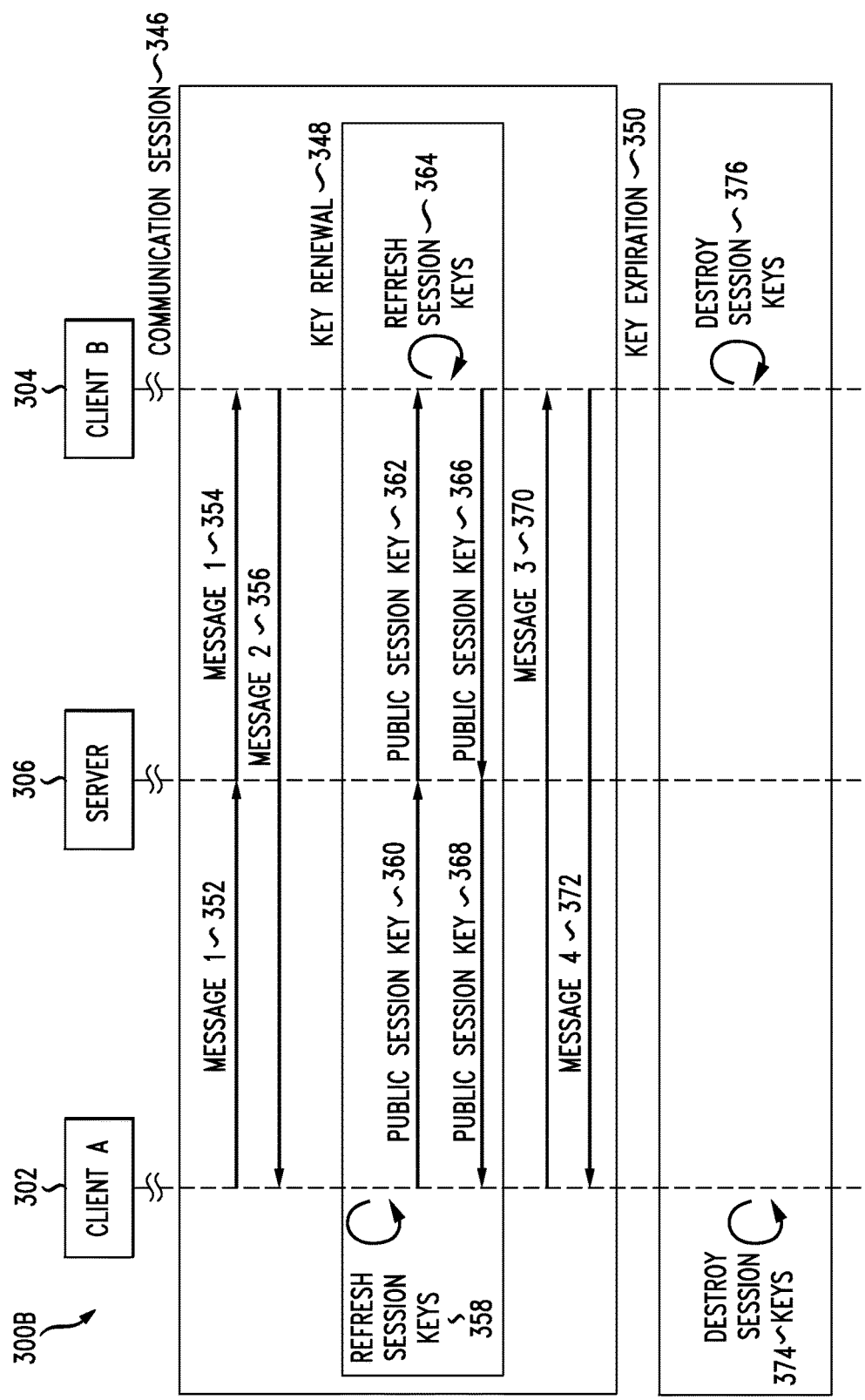
FIG. 3B shows a sequence diagram for conducting the exemplary non-replayable communication session.

FIG. 3B shows sequence diagram 300B for conducting the exemplary non-replayable communication session. Sequence diagram 300B may be a continuation of sequence diagram 300A, and communication session 346 may directly follow key exchange 312. During communication session 346 between Client A 302 and Client B 304, optional key renewal 348 may be performed during communication session 346. After communication session 346 is terminated, key expiration 350 may also follow communication session 346. After key exchange 312 and at the start of communication session 346, Client A 302 may have in its storage, its own identity key pair and its session key pair as well as the public identity key and the public session key that it received from Client B 304. Conversely, Client B 304 may have in its own storage, its identity key pair and the session key pair, in addition to the public identity key and the public session key that belong to Client A 302.

Utilizing these various cryptographic keys, Client A 302 and Client B 304 can exchange multiple encrypted messages, such as message 1 (352, 354), message 2 (356), message 3 (370), and message 4 (372), during communication session 346. These messages may contain text, voice, audio, video, documents, etc. Although FIG. 3B is shown as depicting Client A 302 and Client B 304 exchanging four messages, one of skill in the art will understand that any number of messages in any order may be exchanged between the two devices during the course of communication session 346. These messages may vary in size, duration, priority, content type, etc. Some messages, such as message 1 (352, 354) can be transmitted via server 306, while other messages, such as message 2 (356), message 3 (370), and message 4 (372) can be transmitted directly from one client device to another via a peer-to-peer communication protocol (e.g., Web Real-Time Communication (WebRTC)). In some aspects, communication session 346 may start off as a server-relayed communication session, and then it can be handed off to a peer-to-peer message exchange during communication session 346.

Each message may be encrypted using a public session key belonging to the receiver. For example, message 1 (352), which originates from Client A 302 and is destined for Client B 304, can be encrypted with the public session key that belongs to Client B 304 and decrypted by the matching private session key. In another example, message 2 (356), which is sent by Client B 304 and received by Client A 302, can be encrypted by Client B 304 with Client A's 302 public session key and decrypted by Client A 302 using its private session key. Moreover, the exchanged messages can be doubly encrypted with public session keys and public identity keys. For example, message 1 (352, 354) can be encrypted by Client A 302 using Client B's 304 public identity key and public session key, and then be decrypted by Client B 304 using its private identity key and private session key. Communication session 346 can be explicitly terminated by either client device by issuing a terminate session message to the other device. Otherwise, communication session 346 can be configured to expire automatically when the communication between the two devices is "idle" for a while. For example, communication session 346 can be configured such that if there is no message exchanged between the two devices for a predetermined amount of time, session 346 is terminated.

Optionally, one or more key renewals 348 may occur during communication session 346. At key renewal 348, one or more session keys are rolled and replaced with new sets of session keys. Key renewal 348 may occur at various time intervals. For example, communication session 346 may be configured to roll session keys every 10 minutes or after every 10 messages exchanged. One of skill in the art will recognize that other conditions may be used to determine the timing of key renewal 348. Renewing keys often may consume more time and/or resources, but it can increase security and decrease recoverability of past messages. Key renewal 348 can be performed in a similar fashion as key exchange 312. For instance, as part of key renewal 348, Client A 302 may refresh its stored session keys 358. This may include destroying Client A's 302 public session key, destroying Client A's 302 private session key, destroying Client B's 304 public session key, and/or generating Client A's 302 new session key pair. Client A 302 may then transmit the newly generated public session key to server 306 (360), which then forwards the key to Client B 304 (362). Alternatively, the key can be sent directly to Client B 304 without passing through server 306.

Similarly, Client B 304 may also refresh one or more session keys (364), and send its new public session key to Client A 302 (366, 368). Although FIG. 3B shows Client A 304 as renewing its session keys after Client A 302 does, one of skill in the art will understand that Client B 304 may refresh session keys before or contemporaneously with Client A 302. Once key renewal 348 is complete, any subsequent messages can be encrypted with the new public session keys. For example, message 3 (370) may be encrypted with Client B's 304 new public session key and decrypted with Client B's 304 new private session key, while message 4 (372) may be encrypted with Client A's 302 new public session key and decrypted with Client A's 302 new private session key. In some aspects, key renewal 348 may mark the end of the current communication session and the start of a new communication session. Thus, message 3 (370) and message 4 (372) can be considered part of a new communication session that is separate from communication session 346.

Upon completion of communication session 346, or sometime after communication session 346 terminates but before a new communication begins, Client A 302 and Client B 304 may destroy one or more session keys involved with communication session 346 in order to decrease recoverability of messages exchanged during communication session 346. Some of the session keys used during communication session 346 to encrypt messages may have already expired during communication session 346 by one or more key renewal processes 348. However, the last remaining session keys may also expire at the conclusion of communication session 346. To satisfy the non-replayability requirement, Client A 302 can destroy one or more session keys stored in its key storage (374). This may include its own private-public session key pair and Client B's 304 public session key. The destruction of keys may be accomplished by erasing the relevant data from storage such as memory, hard disk drive, etc. The session keys can be overwritten with other data, such as new session key data, to render the recovery of the old keys more difficult or impossible. Similarly, client B 304 may also destroy one or more session keys (376). Optionally, one or more identity keys may also be refreshed or destroyed at this time, although doing so may not be necessary for the sake of non-replayability.

Figure 4:
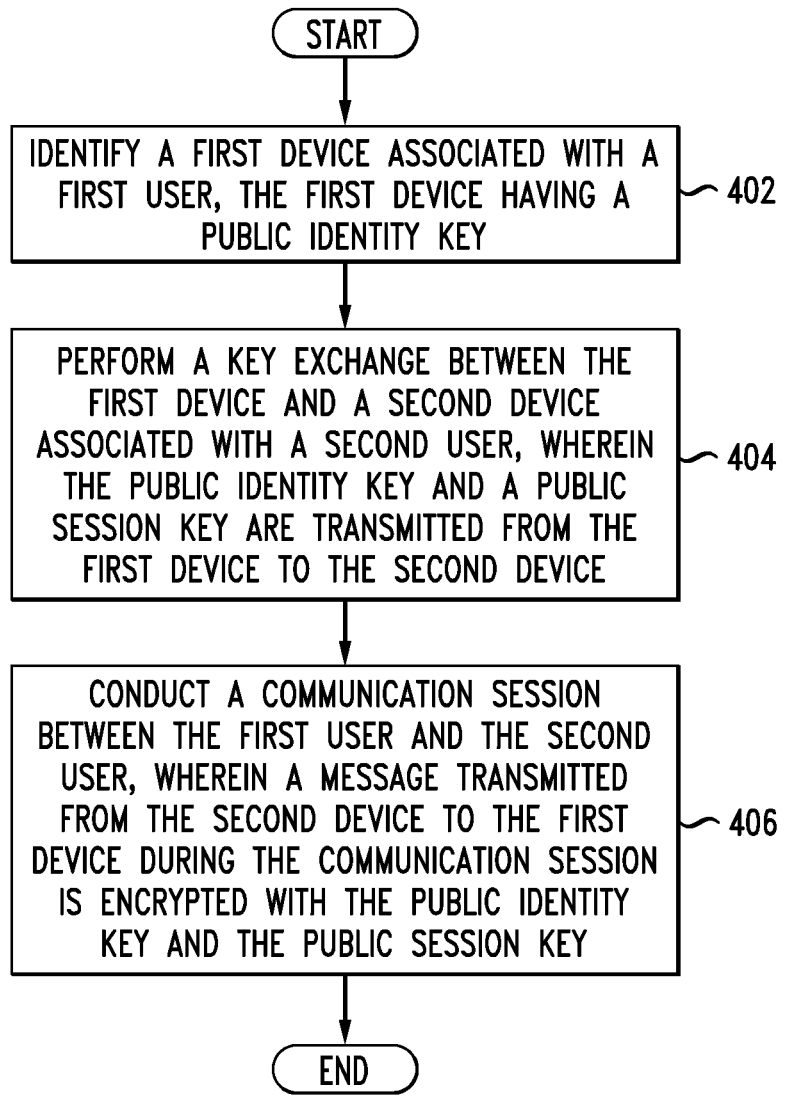
FIG. 4 shows an exemplary method embodiment.
Figure 5B:
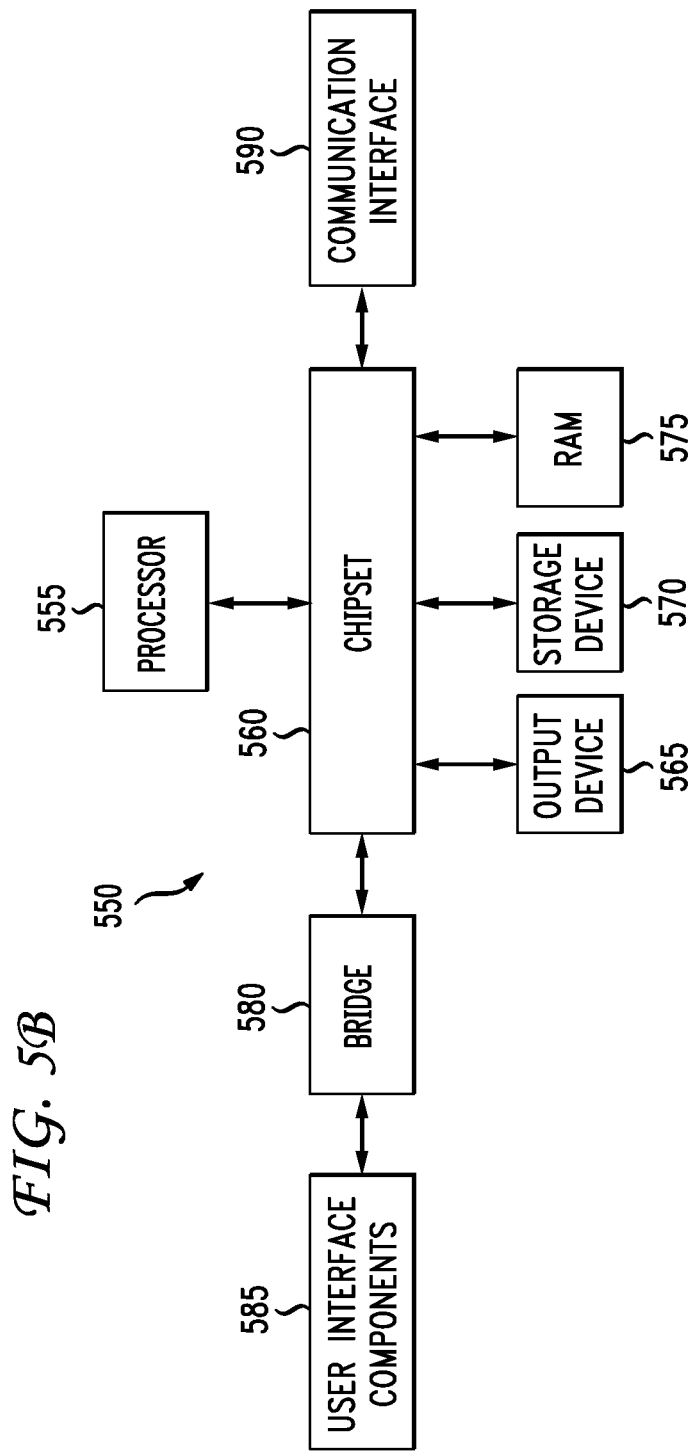
FIG. 5B shows the second exemplary system embodiment for implementing various embodiments of the present technology.

Having disclosed some basic system components and concepts, the disclosure now turns to the example method embodiment shown in FIG. 4. For the sake of clarity, the method is described in terms of system 100 that consists of server 110 and two client devices 106, 108, as shown in FIG. 1, configured to practice the method. Alternatively, however, the method may also be practiced by system 500 as shown in FIG. 5A or system 550 as shown in FIG. 5B. The steps outlined herein are exemplary and can be implemented in any combination thereof in any order, including combinations that exclude, add, or modify certain steps.

FIG. 4 shows an exemplary method embodiment. First, system 100 may identify a first device associated with a first user, the first device having a public identity key (402). A public key, such as the public identity key, and a corresponding private key, such as a private identity key, may be mathematically linked to each other such that an encrypted message encrypted with the public key can only be decrypted with the corresponding private key. system 100 may perform a key exchange between the first device and a second device associated with a second user, wherein the public identity key and a public session key are transmitted from the first device to the second device (404).

Prior to performing the key exchange, system 100 may generate, at the first device, the first public identity key and a first private identity key that corresponds to the first public identity key, wherein the first public identity key and the first private identity key are specific to the first user and the first device. Also prior to performing the key exchange, system 100 may register the first user with an authenticator by posting the public identity key from the first device to the authenticator. System 100 may receive, at the first device, a first indication from the first user to initiate the communication session. System 100 may then transmit, from the first device to the authenticator, a request to initiate the communication session. System 100 may forward the request from the authenticator to the second device, and receive, at the second device, a second indication from the second user to accept the request.

The key exchange may be performed by fetching, at the second device, the first public identity key from an authenticator, wherein the first device is registered with the authenticator. System 100 may then generate, at the second device, a second public session key and a second private session key that corresponds to the second public session key, such that the second public session key and the second private session key are specific to the communication session, the second user, and the second device. System 100 can transmit, from the second device to the first device via the authenticator, a first key exchange message comprising a second public identity key and the second public session key, wherein the first key exchange message is encrypted with the first public identity key, wherein the second public identity key corresponds to a second private identity key, and wherein the second public identity key and the second private identity key are specific to the second user and the second device. System 100 may generate, at the first device, the first public session key and a first private session key that corresponds to the first public session key, such that the first public session key and the first private session key are specific to the communication session, the first user, and the first device. System 100 may then transmit, from the first device to the second device, a second key exchange message comprising the first public session key. The second key exchange message can be transmitted via the authenticator. In addition, the second key exchange message can be encrypted with the second public identity key and/or the second public session key. The first device can store a private session key, which corresponds to the public session key, in a volatile memory associated with the first device.

The first device can be configured to overwrite the private session key in the volatile memory with other data when the private session key expires. The other data can be a new private session key.

After the key exchange is performed, system 100 may conduct a communication session between the first user and the second user, wherein a message transmitted from the second device to the first device during the communication session is encrypted with the public identity key and the public session key (406). The message may be encrypted only with the public session key. The communication session may include transmitting an encrypted message from the first device to the second device, the encrypted message being encrypted with the second public identity key and the second public session key. System 100 may also decrypt the encrypted message at the second device using the second private identity key and the second private session key. The first encrypted message can be transmitted from the first device to the second device via an authenticator. Otherwise, the first encrypted message can be transmitted from the first device to the second device via a peer-to-peer connection. During the communication session, system 100 can also transmit an encrypted message from the second device to the first device, the encrypted message being encrypted with the first public identity key and the first public session key. System 100 may then decrypt the encrypted message at the first device using the first private identity key and the first private session key.

The public session key may be configured to expire upon completion of the communication session. The public session key may also be configured to expire before a subsequent communication session. In addition, the public session key can be configured to expire during the communication session. As such, upon expiration of the public session key, system 100 may generate, at the first device, a new public session key associated with the communication session. System 100 may then perform another key exchange between the first device and the second device, wherein the new public session key is transmitted from the first device to the second device. The communication session may be further conducted, wherein one or more messages transmitted from the second device to the first device during the communication session are encrypted with the public identity key and the new public session key.

FIG. 5A and FIG. 5B show exemplary system embodiments. For example, Device A 106, Device B 108, and/or authenticator 110, as shown in FIG. 1, may each be implemented as exemplary system 500 of FIG. 5A or exemplary system 550 of FIG. 5B. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 (532), module 2 (534), and module 3 (536) stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid-state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A method comprising:
   receiving, at a second device, a public identity key and a first public session key corresponding to a first device;
   generating, by the second device, a first message;
   generating, by the second device, a first encrypted message based on the first message, the public identity key, and the first public session key; and
   transmitting, by the second device, the first encrypted message to the first device.

2. The method of claim 1, wherein the second device receives the public identity key corresponding to the first device from a server.

3. The method of claim 1, wherein the second device receives the public identity key corresponding to the first device directly from the first device.

4. The method of claim 1, wherein the second device receives the public session key corresponding to the first device, directly from the first device or via a server.

5. The method of claim 1, wherein the second device transmits the first encrypted message to the first device via a server.

6. The method of claim 1, wherein the second device transmits the first encrypted message to the first device via a peer-to-peer connection.

7. The method of claim 1, further comprising:
   encrypting the message using the public identity key and the first public session key corresponding to the first device.

8. The method of claim 1, further comprising:
   discarding the first public session key after sending the first encrypted message to the first device.

9. The method of claim 1, further comprising:
   discarding the first public session key after a pre-determined time interval.

10. The method of claim 1, further comprising:
    discarding the first public session key during a communication session between the first device and the second device.

11. The method of claim 1, further comprising:
    transmitting, by the second device and to the first device, a public session key of the second device; and
    receiving, by the second device and from the first device, a third message encrypted with the public session key of the second device.

12. The method of claim 11, further comprising:
    decrypting, by the second device, the third message with a private session key of the second device corresponding to the public session key of the second device.

13. The method of claim 1, further comprising:
    discarding the first public session key after a communication session between the first device and the second device ends.

14. The method of claim 1, further comprising:
    receiving, by the second device, a second public session key corresponding to the first device;
    generating, by the second device, a second message; and
    generating, by the second device, a second encrypted message based on the second message, the public identity key, and the second public session key.

15. The method of claim 14, wherein the second device receives the second public session key corresponding to the first device after the second device transmits the first encrypted message to the first device.

16. The method of claim 14, wherein the second device receives the second public session key corresponding to the first device after a pre-determined time interval.

17. The method of claim 14, wherein the second device receives the second public session key corresponding to the first device during a communication session between the first device and second device.

18. The method of claim 14, wherein the second device receives the second public session key corresponding to the first device after a communication session between the first device and second device ends.

19. A system comprising:
    a processor; and
    a non-transitory computer-readable storage medium storing instructions which, when executed by the processor, cause the processor to:
    receive a public identity key and a first public session key corresponding to a first device;
    generate a first message;
    generate a first encrypted message based on the first message, the public identity key, and the first public session key; and
    transmit the first encrypted message to the first device.

20. A non-transitory computer-readable storage device storing instructions which, when executed by a processor, cause the processor to:
    receive a public identity key and a first public session key corresponding to a first device;
    generate a first message;
    generate a first encrypted message based on the first message, the public identity key, and the first public session key; and
    transmit the first encrypted message to the first device.

21. A method comprising:
   generating, at a first device, a first public session key corresponding to the first device;
   transmitting, the first public session key to a second device where a public identity key corresponding to the first device is stored; and
   receiving, by the first device and from the second device, a first encrypted message based on a first message generated by the second device, the public identity key, and the first public session key.

22. The method of claim 21, wherein the first device transmits the first public session key to the second device directly or via a server.

23. The method of claim 21, wherein the second device transmits the first encrypted message to the first device via a server.

24. The method of claim 21, wherein the second device transmits the first encrypted message to the first device via a peer-to-peer connection.

25. The method of claim 21, further comprising:
   decrypting the first encrypted message using a private identity key associated with the public identity key corresponding to the first device.

26. The method of claim 21, further comprising:
   discarding, at the first device, the first public session key at a time selected from the group consisting of i) after receiving the first encrypted message from the second device, ii) after a pre-determined time interval, iii) during a communication session between the first device and the second device; and iv) after a communication session between the first device and the second device ends.

27. The method of claim 21, wherein the public identity key is generated by the first device.

28. The method of claim 27, wherein the public identity key is transmitted from the first device to the second device directly or via a server.

29. The method of claim 21, further comprising:
   generating, by the first device, a new public session key corresponding to the first device.

30. The method of claim 29, wherein the new public session key is transmitted to the second device directly or via a server.

31. The method of claim 29, wherein the new public session key is transmitted to the second device at a time selected from the group consisting of i) after receiving the first encrypted message from the second device, ii) after a pre-determined time interval, iii) during a communication session between the first device and the second device; and iv) after a communication session between the first device and the second device ends.

32. The method of claim 29, further comprising:
   transmitting, from the first device, the new public session key to the second device; and
   receiving, by the first device and from the second device, a new message encrypted with the new public session key of the first device.

33. A system comprising:
   a processor; and
   a non-transitory computer-readable storage medium storing instructions which, when executed by the processor, cause the processor to:
   generate, at a first device, a first public session key corresponding to the first device;
   transmit, the first public session key to a second device where a public identity key corresponding to the first device is stored; and
   receive, by the first device and from the second device, a first encrypted message based on a first message generated by the second device, the public identity key, and the first public session key.

34. A non-transitory computer-readable storage device storing instructions which, when executed by a processor, cause the processor to:
   generate, at a first device, a first public session key corresponding to the first device;
   transmit, the first public session key to a second device where a public identity key corresponding to the first device is stored; and
   receive, by the first device and from the second device, a first encrypted message based on a first message generated by the second device, the public identity key, and the first public session key.

* * * * *